US010846635B1

(12) United States Patent
Prada Gomez et al.

(10) Patent No.: US 10,846,635 B1
(45) Date of Patent: *Nov. 24, 2020

(54) DISPATCHING AUTONOMOUS VEHICLES BASED ON ROUTE COST

(71) Applicant: Waymo LLC, Mountain View, CA (US)

(72) Inventors: Luis Ricardo Prada Gomez, Hayward, CA (US); Andrew Timothy Szybalski, San Francisco, CA (US); Sebastian Thrun, Los Altos, CA (US); Philip Nemec, San Jose, CA (US); Christopher Paul Urmson, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 351 days.

This patent is subject to a terminal disclaimer.

(21) Appl. No.: 15/606,150

(22) Filed: May 26, 2017

Related U.S. Application Data

(63) Continuation of application No. 14/101,693, filed on Dec. 10, 2013, now abandoned, which is a continuation of application No. 13/004,514, filed on Jan. 11, 2011, now Pat. No. 8,630,897.

(51) Int. Cl.
| *G06Q 10/06* | (2012.01) |
| *G06Q 30/02* | (2012.01) |
| *G06Q 50/30* | (2012.01) |
| *G05D 1/00* | (2006.01) |
| *G01C 21/34* | (2006.01) |
| *G08G 1/00* | (2006.01) |
| *G06F 16/29* | (2019.01) |

(52) U.S. Cl.
CPC ....... *G06Q 10/06313* (2013.01); *G01C 21/34* (2013.01); *G05D 1/0088* (2013.01); *G06Q 30/0269* (2013.01); *G06Q 30/0275* (2013.01); *G06Q 30/0283* (2013.01); *G06Q 50/30* (2013.01); *G08G 1/202* (2013.01); *G06F 16/29* (2019.01)

(58) Field of Classification Search
CPC .............. G06Q 50/30; G06Q 30/0241; G06Q 30/0265; G05D 2201/0212
See application file for complete search history.

(56) References Cited

U.S. PATENT DOCUMENTS 2,536,290 A * 1/1951 Jones ................... G09B 29/102
340/990
5,604,676 A * 2/1997 Penzias ................ G06Q 10/047
705/417
5,636,122 A * 6/1997 Shah ...................... G01C 21/36
340/990

(Continued)

OTHER PUBLICATIONS

Forrest, Alex et al., Autonomous Cars and Society Worcester Polytechnic Institute, May 1, 2007 (Year: 2007).*

(Continued)

*Primary Examiner* — Scott L Jarrett
(74) *Attorney, Agent, or Firm* — Botos Churchill IP Law

(57) ABSTRACT

The present invention relates generally to dispatching transportation to a business location. More specifically, an autonomous vehicle may be dispatched to pick up a passenger and transport that passenger to the business location.

20 Claims, 8 Drawing Sheets

(56) References Cited

U.S. PATENT DOCUMENTS

| | | | | |
|---|---|---|---|---|
| 5,945,919 | A * | 8/1999 | Trask | G08G 1/202 235/384 |
| 5,973,619 | A * | 10/1999 | Paredes | G06Q 10/02 235/384 |
| 6,151,539 | A * | 11/2000 | Bergholz | B60W 30/186 701/25 |
| 6,317,718 | B1 | 11/2001 | Fano | |
| 6,356,838 | B1 * | 3/2002 | Paul | G01C 21/3453 701/410 |
| 6,394,231 | B1 * | 5/2002 | Schuster | B66B 3/00 187/247 |
| 6,411,897 | B1 * | 6/2002 | Gaspard, II | G01C 21/343 340/991 |
| 6,615,046 | B1 * | 9/2003 | Ur | H04W 84/08 455/422.1 |
| 6,711,548 | B1 | 3/2004 | Rosenblatt | |
| 6,756,913 | B1 * | 6/2004 | Ayed | G06Q 10/02 |
| 6,812,851 | B1 * | 11/2004 | Dukach | G06Q 30/02 340/425.5 |
| 7,080,019 | B1 * | 7/2006 | Hurzeler | G06Q 10/025 705/6 |
| 7,299,195 | B1 * | 11/2007 | Tawakol | G06Q 30/02 705/14.71 |
| 7,403,905 | B2 * | 7/2008 | Shioda | G01C 21/26 455/456.3 |
| 7,577,244 | B2 * | 8/2009 | Taschereau | G06Q 30/0241 379/218.01 |
| 7,761,314 | B2 * | 7/2010 | Fitzgerald | G06Q 10/02 705/5 |
| 8,131,307 | B2 | 3/2012 | Lubeck et al. | |
| 8,285,570 | B2 * | 10/2012 | Meyer | G06Q 50/14 705/5 |
| 8,442,848 | B2 * | 5/2013 | Myr | G08G 1/202 705/6 |
| 8,554,608 | B1 * | 10/2013 | O'Connor | G08G 1/0962 705/1.1 |
| 8,630,897 | B1 * | 1/2014 | Prada Gomez | G06Q 30/0241 705/14.11 |
| 8,706,542 | B2 * | 4/2014 | O'Meara | G06Q 10/06 705/7.16 |
| 8,725,612 | B2 * | 5/2014 | Mundinger | G06Q 10/047 705/35 |
| 9,111,315 | B2 * | 8/2015 | Mitchell | G06Q 30/08 |
| 9,483,744 | B2 * | 11/2016 | Lord | G06Q 50/30 |
| 9,646,326 | B2 * | 5/2017 | Goralnick | G01C 21/36 |
| 9,904,900 | B2 * | 2/2018 | Cao | G06Q 10/083 |
| 10,002,198 | B2 * | 6/2018 | Felt | G06Q 10/0631 |
| 10,176,517 | B2 * | 1/2019 | Goralnick | G06Q 30/0265 |
| 2001/0034625 | A1 | 10/2001 | Kwoh | |
| 2002/0052751 | A1 * | 5/2002 | Ebata | G06Q 10/08355 705/417 |
| 2002/0055861 | A1 * | 5/2002 | King | G06Q 10/10 705/4 |
| 2002/0057212 | A1 | 5/2002 | Hamilton et al. | |
| 2002/0095326 | A1 * | 7/2002 | Katz | G06Q 10/06315 705/7.13 |
| 2002/0099599 | A1 | 7/2002 | Minassian | |
| 2002/0183920 | A1 * | 12/2002 | Smith | G06Q 30/02 701/117 |
| 2003/0028536 | A1 * | 2/2003 | Singh | H04W 4/029 |
| 2003/0040944 | A1 * | 2/2003 | Hileman | G06Q 10/02 705/5 |
| 2003/0055689 | A1 | 3/2003 | Block et al. | |
| 2003/0065556 | A1 * | 4/2003 | Takanashi | G08G 1/202 705/13 |
| 2003/0177062 | A1 * | 9/2003 | Chen | G07C 5/008 705/13 |
| 2003/0220835 | A1 * | 11/2003 | Barnes, Jr. | H04M 1/72519 705/14.36 |
| 2003/0225600 | A1 | 12/2003 | Slivka et al. | |
| 2004/0219933 | A1 * | 11/2004 | Faith | H04W 4/02 455/456.3 |
| 2004/0225560 | A1 | 11/2004 | Lewis et al. | |
| 2004/0236501 | A1 * | 11/2004 | Hirose | G08G 1/202 701/422 |
| 2004/0260470 | A1 * | 12/2004 | Rast | G06Q 10/06 701/300 |
| 2005/0033616 | A1 | 2/2005 | Vavul et al. | |
| 2005/0097024 | A1 * | 5/2005 | Rainey | G06Q 30/02 705/37 |
| 2006/0034201 | A1 * | 2/2006 | Umeda | G06Q 30/02 370/310 |
| 2006/0053053 | A1 | 3/2006 | Baggett et al. | |
| 2006/0053054 | A1 | 3/2006 | Baggett et al. | |
| 2006/0053055 | A1 | 3/2006 | Baggett | G06Q 10/02 705/14.33 |
| 2006/0059023 | A1 * | 3/2006 | Mashinsky | G06Q 10/02 705/5 |
| 2006/0136254 | A1 * | 6/2006 | Greenstein | G06Q 10/02 705/5 |
| 2006/0242017 | A1 * | 10/2006 | Libes | G06Q 10/10 705/14.54 |
| 2006/0276204 | A1 * | 12/2006 | Simpson | H04W 99/00 455/456.5 |
| 2007/0038514 | A1 * | 2/2007 | Patterson | G06Q 30/02 705/14.48 |
| 2007/0061057 | A1 * | 3/2007 | Huang | G06Q 30/02 701/23 |
| 2007/0073552 | A1 | 3/2007 | Hileman | |
| 2007/0194912 | A1 * | 8/2007 | Lee | G06Q 10/00 340/539.18 |
| 2007/0233653 | A1 * | 10/2007 | Biggs | G06Q 30/02 |
| 2007/0299682 | A1 * | 12/2007 | Roth | G06Q 30/02 705/1.1 |
| 2008/0015923 | A1 * | 1/2008 | Masaba | G06Q 10/06311 705/7.13 |
| 2008/0033805 | A1 * | 2/2008 | Padin | G06Q 30/02 705/14.64 |
| 2008/0114629 | A1 * | 5/2008 | Pavlov | G06Q 10/08 705/347 |
| 2008/0114672 | A1 * | 5/2008 | Yahia | G06Q 30/02 705/37 |
| 2008/0161986 | A1 * | 7/2008 | Breed | G08G 1/163 701/23 |
| 2008/0189143 | A1 * | 8/2008 | Wurster | G06Q 10/02 705/5 |
| 2008/0189226 | A1 * | 8/2008 | Wurster | G06Q 10/06 705/417 |
| 2008/0195428 | A1 * | 8/2008 | O'Sullivan | G06Q 10/00 705/6 |
| 2008/0201227 | A1 | 8/2008 | Bakewell et al. | |
| 2008/0281516 | A1 * | 11/2008 | Cummings | G08G 1/096872 701/414 |
| 2008/0288318 | A1 * | 11/2008 | Webb | B23P 6/007 705/7.22 |
| 2009/0005987 | A1 * | 1/2009 | Vengroff | G06Q 30/0261 701/300 |
| 2009/0076915 | A1 * | 3/2009 | Tighe | G06Q 30/02 705/14.62 |
| 2009/0125340 | A1 * | 5/2009 | Gosney | G06Q 10/02 705/5 |
| 2009/0156241 | A1 * | 6/2009 | Staffaroni | G06Q 10/06311 455/466 |
| 2009/0176508 | A1 * | 7/2009 | Lubeck | H04W 4/029 455/456.2 |
| 2009/0192851 | A1 * | 7/2009 | Bishop | G06Q 10/08 705/26.3 |
| 2009/0216600 | A1 * | 8/2009 | Hill | G06Q 10/06 705/7.14 |
| 2009/0254405 | A1 * | 10/2009 | Hollis | G06Q 10/06 705/7.25 |
| 2009/0313077 | A1 * | 12/2009 | Wheeler, IV | G01C 21/26 705/7.14 |
| 2010/0036687 | A1 * | 2/2010 | Bansal | G06Q 10/02 705/5 |
| 2010/0042421 | A1 * | 2/2010 | Bai | G06Q 30/02 705/14.71 |

(56) References Cited

U.S. PATENT DOCUMENTS

| | | | | |
|---|---|---|---|---|
| 2010/0042549 | A1* | 2/2010 | Adamczyk | G06Q 10/06 705/80 |
| 2010/0049603 | A1* | 2/2010 | Peterson | G06Q 30/02 705/14.45 |
| 2010/0153279 | A1* | 6/2010 | Zahn | G06Q 10/02 705/80 |
| 2010/0228635 | A1* | 9/2010 | Ghosh | G06Q 30/02 705/14.71 |
| 2010/0241349 | A1* | 9/2010 | Wu | G01C 21/3438 701/533 |
| 2010/0256836 | A1 | 10/2010 | Mudalige | |
| 2010/0312591 | A1* | 12/2010 | Wu | G06Q 10/06311 705/7.13 |
| 2011/0301985 | A1* | 12/2011 | Camp | G06Q 10/02 705/5 |
| 2011/0313880 | A1* | 12/2011 | Paul | G06Q 10/08 705/26.7 |
| 2012/0041675 | A1* | 2/2012 | Juliver | G06Q 10/08 701/465 |
| 2012/0185302 | A1* | 7/2012 | Kim | G06Q 30/06 705/13 |
| 2013/0132246 | A1* | 5/2013 | Amin | G06Q 40/10 705/34 |

OTHER PUBLICATIONS

Dial, Robert B., Autonomous Dial-A-Ride Transit Introductory Overview Transportation Research, vol. 3, No. 5, 1995 (Year: 1995).*

Lau, Samuel W., Autonomous Dial-A-Ride Transit Benefit-Cost Evaluation Volpe National Transportation Systems Center, Aug. 1998 (Year: 1998).*

Trademark Electronic Search System (TESS), INTEL, Nov. 28, 2012, United States Patent and Trademark Office.

Trademark Electronic Search System (TESS), Blackberry, Nov. 28, 2012, United States Patent and Trademark Office.

The Free Dictionary by Farlex, Autonomous, May 8, 2013, The Free Dictionary by Farlex.

U.S. Appl. No. 61/390,094, filed Oct. 5, 2010, Autonomous Vehicles.
U.S. Appl. No. 61/391,271, filed Oct. 8, 2010, Autonomous Vehicles.

* cited by examiner

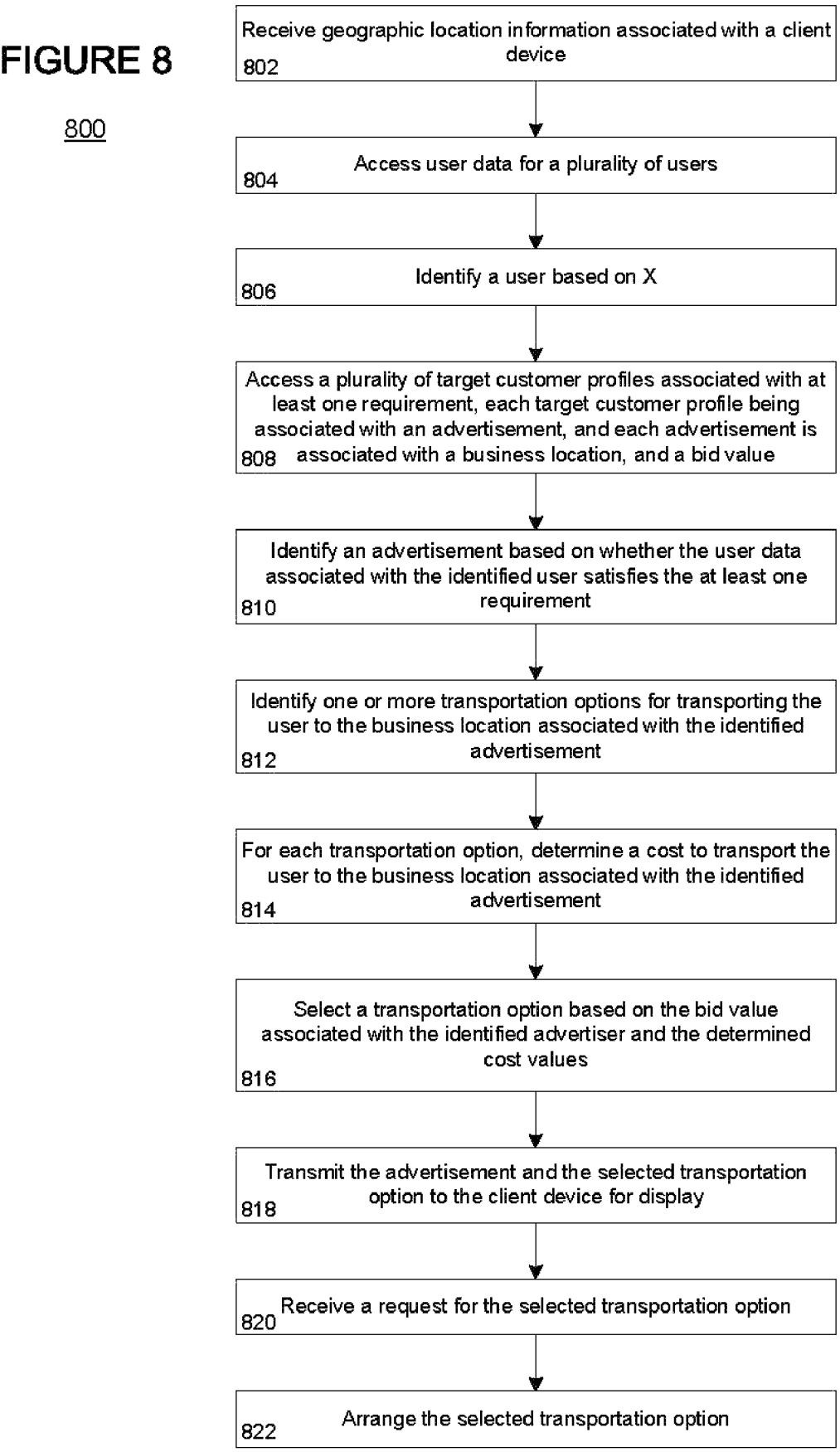

DISPATCHING AUTONOMOUS VEHICLES BASED ON ROUTE COST

CROSS REFERENCE TO RELATED APPLICATION

This application is a continuation of U.S. patent application Ser. No. 14/101,693, filed on Dec. 10, 2013, which is a continuation of U.S. patent application Ser. No. 13/004,514, filed on Jan. 11, 2011, the entire disclosures of which are incorporated herein by reference.

BACKGROUND OF THE INVENTION

Getting a potential customer to a business location in order to conduct a sale may be one of the most difficult tasks for a business or advertiser. A business may have to offer various inducements, such as coupons, discounts, parking validations, etc., in order to entice customers to the location. In some examples, "brick and mortar" businesses may even be forced to invest in more costly real estate near high-traffic areas as opposed to lower-cost real estate in more isolated locations. Occasionally, products may have higher profit margins for the advertiser which justify providing customers with free or low cost transportation (such as rental car agencies). Even then, the advertiser may still conduct intensive cost analyses and arrange complicated route planning with transit vendors. These factors may create a significant financial burden to a business.

In addition, these factors may also place significant burdens on potential customers. For example, a customer must arrange and pay for transportation to the business location whether or not the customer even completes a transaction.

In Internet-based commerce, businesses often compete for "conversions," or completed consumer transactions. Generally, businesses may specify a maximum bid for a conversion and are charged each time a customer is directed to the business's web site in order to complete the transaction. This, however, does not take into account (as it may not be required) the cost of transporting the customer to a business location to physically inspect merchandise or services.

Some offline advertising services also use this conversion-based advertising model by charging businesses for the cost of completed consumer actions, such as a sale, a visit, or providing personal information. Usually, this is accomplished by providing customers with a coupon or other item which is tied to a tracking code that shows how the customer was informed about the store or promotion. Again, these services do not take into account the cost (economic and temporal) of transporting a customer to a business location and place the burden of traveling to the business's location entirely on the customer.

In more well-developed and trafficked locations, for example the Las Vegas area, some transportation companies may arrange referral fees for directing customers to specific locations such as restaurants. However, these systems do not provide a reliable infrastructure for many transportation vendors or businesses to compete and cannot make specific calculations about the desirability of a given customer to a particular business in real time. These referral arrangements may be done privately or in secret rather than via transparent auctions. Thus, these services may exist at the expense of consumers who are paying for the cost of the transportation without realizing that the transportation company is also receiving a referral fee. In addition, this approach also requires a critical mass of consumers in a specific geographic area and well-defined transportation systems, and it may rarely scale across significant distances.

BRIEF SUMMARY OF THE INVENTION

The present invention relates generally to arranging transportation to a business location. More specifically, an autonomous vehicle may be dispatched to pick up a passenger and transport that passenger to the business location.

BRIEF DESCRIPTION OF THE DRAWINGS

FIG. 8 is an exemplary flow diagram in accordance with aspects of the invention.

DETAILED DESCRIPTION

Figure 1:
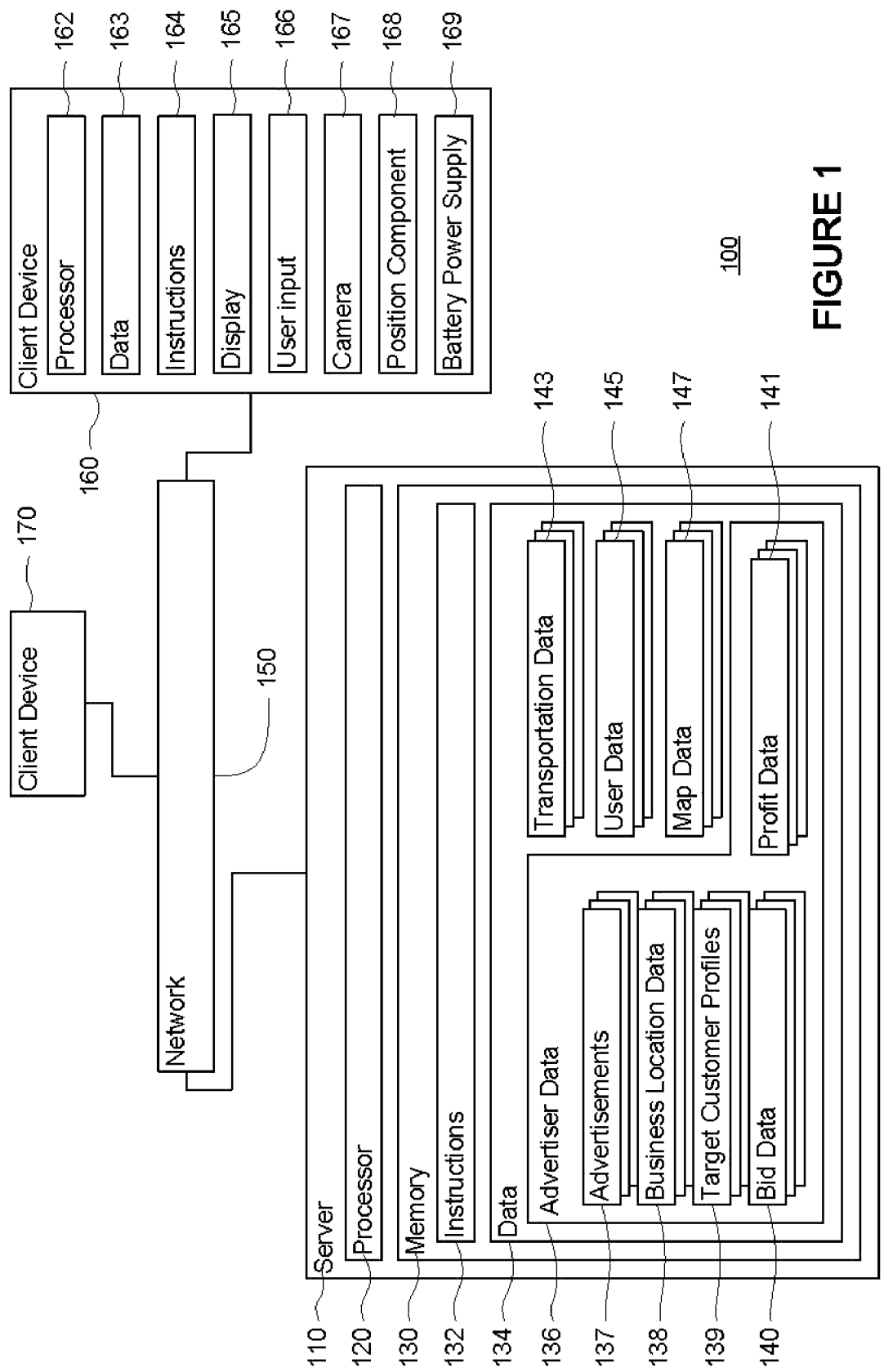
FIG. 1 is a functional diagram of a system in accordance with an aspect of the invention.
Figure 2:
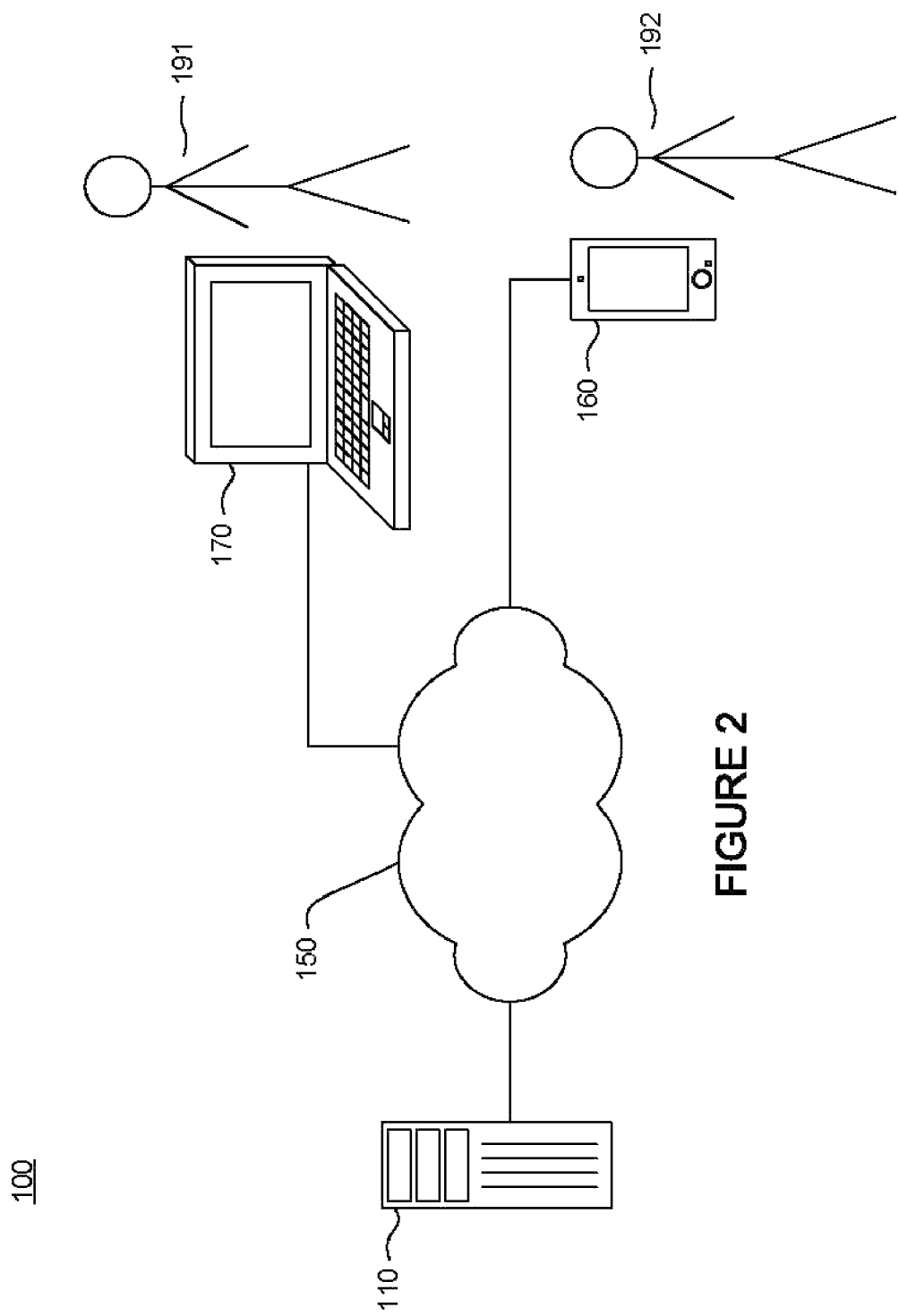
FIG. 2 is a pictorial diagram of the system of FIG. 1.

As shown in FIGS. 1-2, a system 100 in accordance with one aspect of the invention includes a computer 110 containing a processor 120, memory 130 and other components typically present in general purpose computers.

The memory 130 stores information accessible by processor 120, including instructions 132, and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, flash drive, ROM, RAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the architecture is not limited by any particular data structure, the data may be stored in computer registers, in a relational database as a table having a plurality of different fields and records, XML documents or flat files.

The data may also be formatted in any computer-readable format. By further way of example only, image data may be stored as bitmaps comprised of grids of pixels that are stored in accordance with formats that are compressed or uncompressed, lossless or lossy, and bitmap or vector-based, as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from INTEL Corporation or Advanced Micro Devices. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor or computer will be understood to include references to a collection of processors or computers or memories that may or may not operate in parallel The computer 110 may be at one node of a network 150 and capable of directly and indirectly receiving data from other nodes of the network. For example, computer 110 may comprise a web server that is capable of receiving data from client devices 160 and 170 via network 150 such that server 110 uses network 150 to transmit and display information to a user on display 165 of client device 160. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

Network 150, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device may be configured similarly to the server 110, with a processor, memory and instructions as described above. Each client device 160 or 170 may be a personal computer intended for use by a person 191-192, and have all of the components normally used in connection with a personal computer such as a central processing unit (CPU) 162, memory (e.g., RAM and internal hard drives) storing data 163 and instructions 164, an electronic display 165 (e.g., a monitor having a screen, a touch-screen, a projector, a television, a computer printer or any other electrical device that is operable to display information), end user input 166 (e.g., a mouse, keyboard, touch-screen or microphone). The client device may also include a camera 167, position component 168, accelerometer, speakers, a network interface device, a battery power supply 169 or other power source, and all of the components used for connecting these elements to one another.

As shown in FIG. 1, the client devices may also include geographic position component 168, to determine the geographic location and orientation of the device. For example, client device 170 may include a GPS receiver to determine the device's latitude, longitude and altitude position. Thus, as the client device changes location, for example by being physically moved, the GPS receiver may determine a new current location. The component 168 may also comprise software for determining the position of the device based on other signals received at the client device 170, such as signals received at a cell phone's antennas from one or more cell phone towers if the client device is a cell phone. As described below, this information may be transmitted by the client device to the server with the user's permission.

Although the client devices 160 and 170 may each comprise a full-sized personal computer, they may alternatively comprise mobile devices capable of wirelessly exchanging data, including position information derived from position component 168, with a server over a network such as the Internet. By way of example only, client device 160 may be a wireless-enabled PDA or a cellular phone capable of obtaining information via the Internet. The user may input information using a small keyboard (in the case of a BLACKBERRY-type phone), a keypad (in the case of a typical cellular phone) or a touch screen (in the case of a PDA or tablet-type PC).

Data 134 of server 110 may include advertiser data 136. The advertiser data may include various types of information associated with advertisers and their advertisements. For example, the advertiser data may include advertisements 137 and associated content such as text, images, video, or incentives (coupons, discounts, sales, credits, etc.) which server 110 may use to display advertisements to users.

The advertiser data may also include business location data 138 provided by an advertiser. This location data may correspond to a showroom or retail space associated with an advertisement. For example, the information may include an address, contact information, inventory numbers, parking details, or other relevant features associated with the location.

Each advertiser may also identify target customer profiles 139 for one or more advertisements. These customer profiles may include preferred demographics, geographic locations (or areas), or behavioral indications of shopping interests. The target customer profiles may be tailored to the needs of the advertiser and the goods or services advertised in a particular advertisement.

The advertiser may also provide server 110 with bid data 140. The bid data may include, for example, the maximum price an advertiser is willing to pay to have a customer matching a certain profile arrive at a business location and/or take some action, such as a purchase of goods or services. The server may also determine the likelihood of a successful advertising campaign based on the size of the eligible consuming public which the server knows may satisfy the profile and use this information to assist the advertiser in selecting reasonable bids. Advertisers may also select multiple types of profile criteria and adjust their bids based on the availability of each criterion. For example, an advertiser may bid $5.00 to reach males, $5.50 to reach females, and reduce bids by 70% during non-business hours.

Advertisers may also designate bids based on various transportation-based criteria. For example, advertisers may bid based on a current or typical distance of the customer to the business location. An advertiser may select to bid (or to bid more) for customers that are closer to the business location as these customers may live nearby and be more likely to return to the business location. Alternatively, the advertiser may select to bid for customers that are farther away as these customers may be unwilling to travel long distances without having the advertiser subsidize the trip.

Advertisers may also designate bids based on the type or total cost of transporting the customer to the business location. For example, an advertiser may designate a bid amount and allow the system to select transportation option such as autonomous vehicles or public transportation for the customer that meets the advertiser's goals. Alternatively, the advertiser may designate a bid amount but limit the bid to only public transportation or only taxi services.

Advertisers may also designate bids based on the amount of time, or the window of time, which the advertiser has to transport the customer to the business location. For example, the advertiser may be more willing to place a higher bid in order to provide customers with relatively short travel time (such as a few minutes or less) to the business location. This higher bid may allow the server to consider faster transportation alternatives, such as by offering autonomous vehicle rides rather than public transportation rides. The advertiser may also place a higher bid for a customer's transportation towards the end of the business hours than for the same customer earlier in the day, for example, as a function of fluctuating sales quotas.

Advertisers may also designate bids based on the profit margin associated with a customer's interests. For example, an advertiser may select to place a higher bid in order to transport a customer who has indicated an interest in high end retail goods and less to transport a customer who has indicated an interest in less expensive goods as profit margins may be significantly lower.

Advertisers may also designate bids based on a customer's buying history. For example, advertisers may bid more to have customers which consistently use the transportation service to make purchases as compared to those who appear to travel without actually having made any purchases. These purchases may be tracked, for example, using discount codes, passphrases, badges, or standard advertising conversion modes.

It will be understood that the bidding methods and information described above may be used alone or in combination and may be reported to an advertiser in order to assist the advertiser in the selection of reasonable bid values.

Advertisers may also specify a maximum budget to be spent over a particular period of time. If based on a maximum budget, the bid value may be inputted manually, or based on a calculation that considers product inventory, likelihood of a sale, and profit data provided by the advertiser. The profit data may include, for example, profitability reports and information regarding the likelihood and value to the advertiser of a customer completing a purchase at the business location.

In some examples, the advertisers may provide the server with profit data 141 regarding the advertiser's success with a particular advertised product or location. This information may be used to determine reasonable bid values as well as keep track of the advertiser's use of the system.

The server may also have access to transportation data 143 used to calculate the costs to transport a customer to a particular location. For example, the transportation data may include locations and schedules for trains, subways, buses, etc. The transportation data may also include the location of vehicle dispatch locations (such as taxi or rental car services), the locations of the vehicles themselves, and estimated travel times to one or more locations. In some examples, the transportation data may also include the location of various autonomous vehicles, for example, computer-controlled vehicles including, but not limited to, cars, trucks, busses, boats, helicopters, etc. available to transport a customer to a particular business location. It will be understood that autonomous vehicles as used herein may include vehicles which are fully autonomous, semi-autonomous, or include manual driving modes.

The server may also receive information from users or customers and store this information as user data 145. The user data 145 may be used to generate user profiles and determine whether a particular user meets an advertiser's target customer profile. For example, customers of the service may optionally select to provide the server with information about the customer in order to develop a personal profile for the customer. The profile may include information such as the user's age gender, income, and interests. The customer may also provider various transportation preferences such as "I only want to take an autonomous vehicle" or "I do not want to use public transportation." For example, the customer may provide the server with access to the user's personal calendar or a personal web site. The customer may also input relevant profile information, such as birth date or personal interests, into the customer's computer or phone. In another example, in accordance with preset or user selected access levels, the service may scan temporary files, such as cookies, on the customer's computer or phone, identify the customer's prior web queries, and identify the platform or operating system the customer is using, in order to identify relevant profile information.

Preferably, privacy protections are provided for the user data including, for example, filtering of sensitive information, encryption, hashing or filtering of sensitive information to remove personal attributes, time limitations on storage of information, or limitations on data use or sharing.

Data 134 may also include map data 147. The map data may include detailed information about the length and location of roadways, public transportation stations, stops and routes, locations of buildings and other structures, and images of geographic locations or areas. The images may comprise street maps, satellite images, or a combination of these, and may be stored as vectors (particularly with respect to street maps) or bitmaps (particularly with respect to satellite images).

The map data may also be used by the server to determine a route between an initial location and a destination location. The route may include various types of information such as the path of a vehicle or an individual walking and using various transportation methods such as a train, bus, subway, etc. The route may also include a total route length, the length of intermediate route segments along the route, an estimated travel time between the initial location and the destination location. As will be discussed in more detail below, the route may be used to calculate the costs to transport a customer to a particular location.

Systems and methods may process locations expressed in different ways, such as latitude/longitude positions, street addresses, street intersections, an x-y coordinate with respect to the edges of a map (such as a pixel position when a user clicks on a map), names of buildings and landmarks, and other information in other reference systems that is capable of identifying a geographic locations (e.g., lot and block numbers on survey maps). Moreover, a location may define a range of the foregoing. Locations may be further translated from one reference system to another. For example, the client 160 may access a geocoder to convert a location identified in accordance with one reference system (e.g., a street address such as "1600 Amphitheatre Parkway, Mountain View, Calif.") into a location identified in accordance with another reference system (e.g., a latitude/longitude coordinate such as (37.423021°, −122.083939°)). In that regard, it will be understood that exchanging or processing locations expressed in one reference system, such as street addresses, may also be received or processed in other references systems as well.

In addition to the operations described below and illustrated in the figures, various operations in accordance with aspects of the invention will now be described. It should also be understood that the following operations do not have to be performed in the precise order described below. Rather, various steps can be handled in a different order or simultaneously, and steps may be added or removed.

Figure 3:
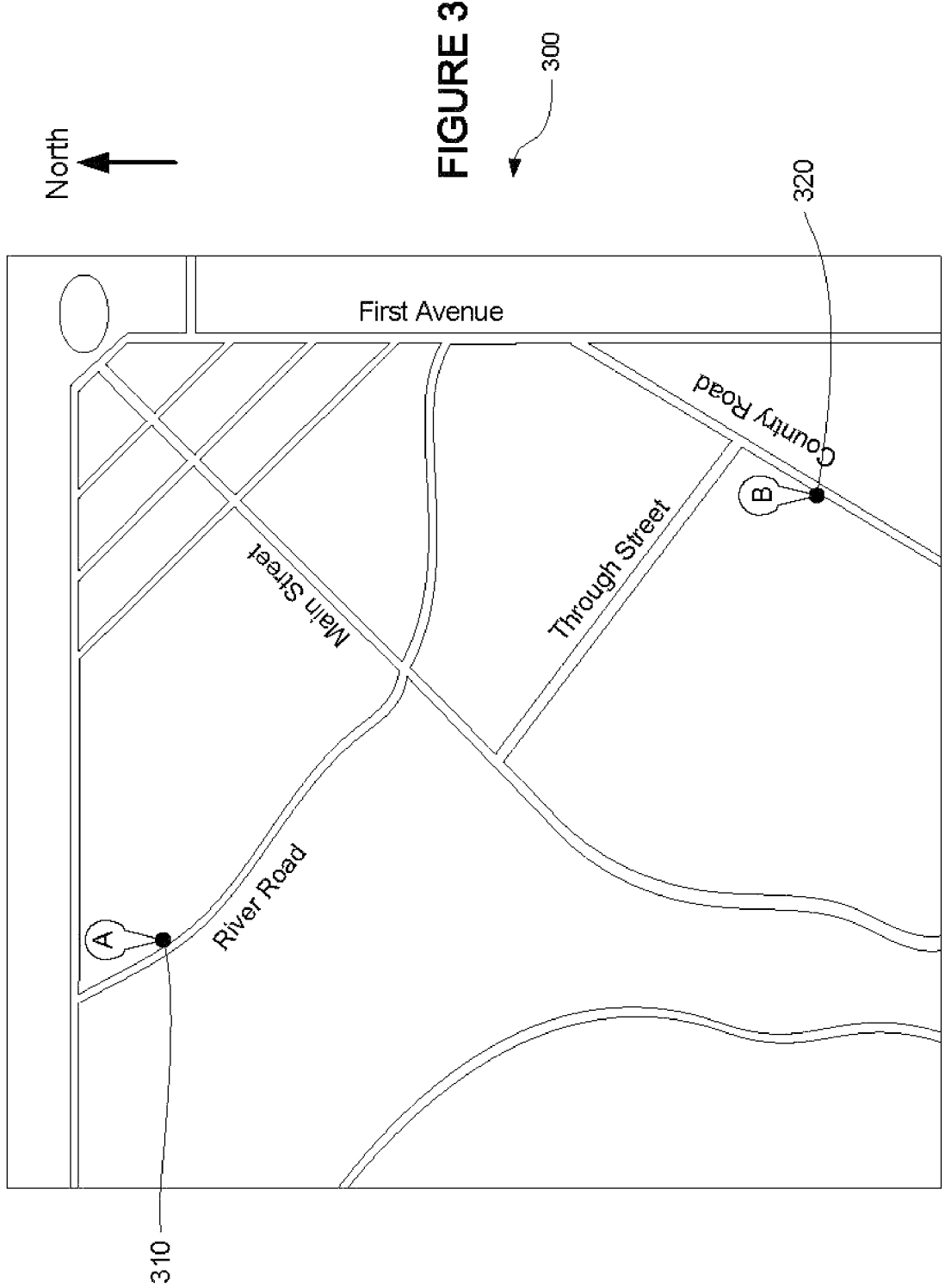
FIG. 3 is a map of exemplary data in accordance with an aspect of the invention.

The server may receive the advertising data as described above. This information may be used to map the locations of the various business locations. For example, as shown in map 300 of FIG. 3, the server has mapped two business locations, business location 310 of Business A at map marker A and business location 320 of Business B at map marker B. Each of these businesses and business locations may be associated with an advertiser. These advertisers may request that the server transport customers to the business locations, based on a particular target customer profile and bid and budget structure as described above.

Figure 4:
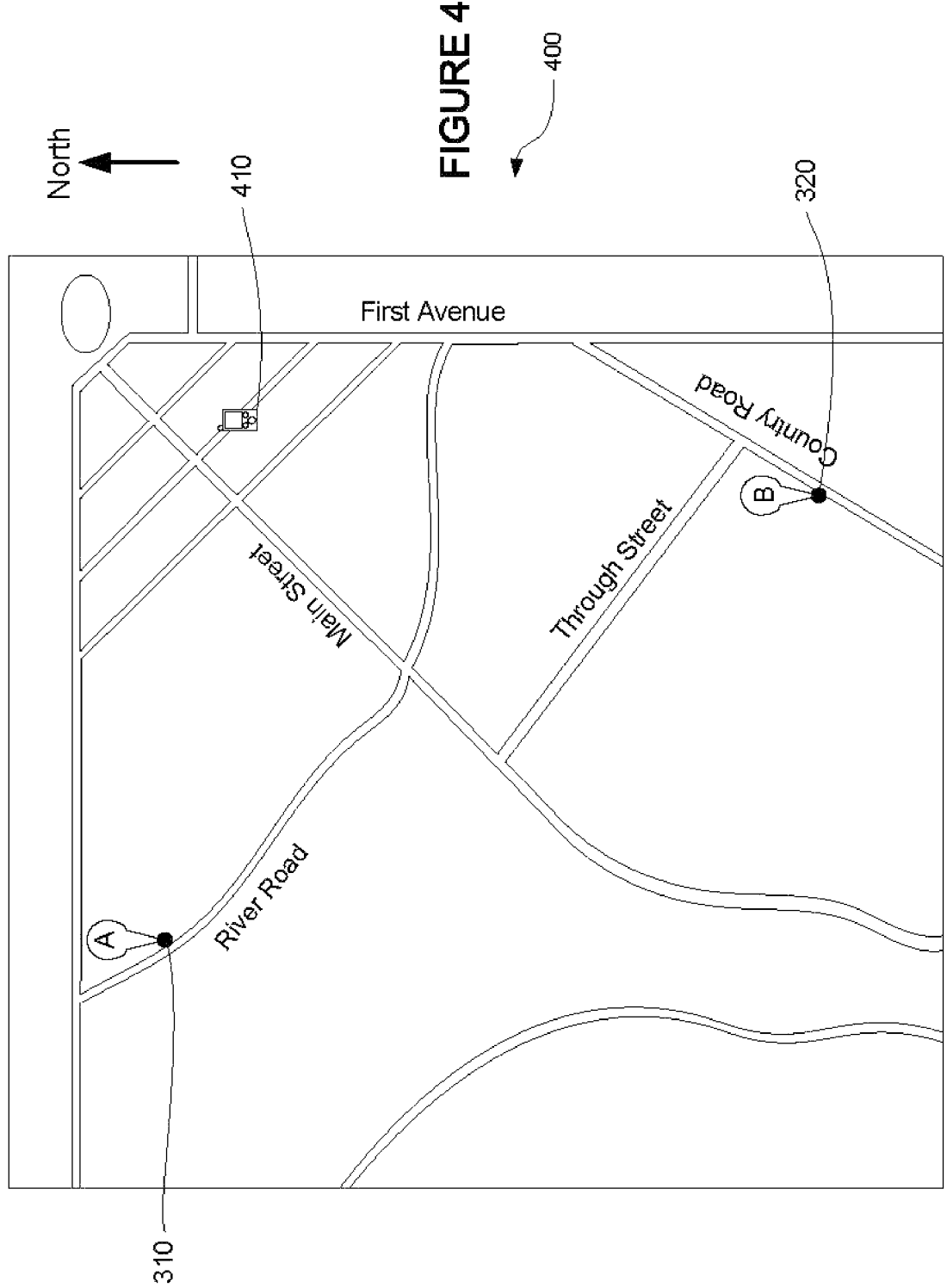
FIG. 4 is another map of exemplary data in accordance with an aspect of the invention.

The server may receive geographic location information from a client device. For example, the geographic position component of a customer's client device may periodically determine a current geographic location of the client device. This location may be expressed, for example, as a set of geolocation coordinates. With the customer's permission, the customer's client device may transmit the geographic location coordinates to the server. In another example, with the customer's permission, the client device may transmit the current geographic location whenever the customer requests information from the server, such as by entering a map query or web search query. In yet another example, the client device may be a stationary computing device, such as a kiosk, and the server may identify the location of the kiosk based on identifying information associated with the kiosk or received from the customer. For example, the customer may present a hotel key to the kiosk which may use the information to identify the current geographic location of the customer or retrieve profile information. As shown in the example of map 400 of FIG. 4, based on the received information, the server may identify a customer's client device at location 410.

The server may also identify the customer associated with the client device and the customer's associated user data. For example, the user may enter a user name and password into the user's client device to be transmitted to the server. As another example, a user may perform an identifying gesture detected by sensors on the device, or be recognized passively through a standard identification process such as an image recognition or motion sensing. The server may receive this information and identify the user and the user's associated user data.

The server may then compare the client device's current location and the customer's user data to the target customer profiles to determine whether the customer falls within one or more advertiser's target customer profile. For example, the target customer profile for Business A may require that the customer be located within a certain distance, such as 5 miles, from the business location and be within a given age group, such as 30-50 year olds. If the customer has indicated in his or her profile that he or she is 31 years old and the current location of the client device is 4 miles from business location 310, the server may determine that the customer satisfies the target customer profile associated with Business A. The customer's profile may also indicate his or her job title, purchasing history, clothing size or other characteristic that the server may match to a desirable customer profile for the advertiser. Alternatively, the system may use characteristics to exclude a customer from being considered for an offer based on exclusion criteria identified by a business.

Figure 5:
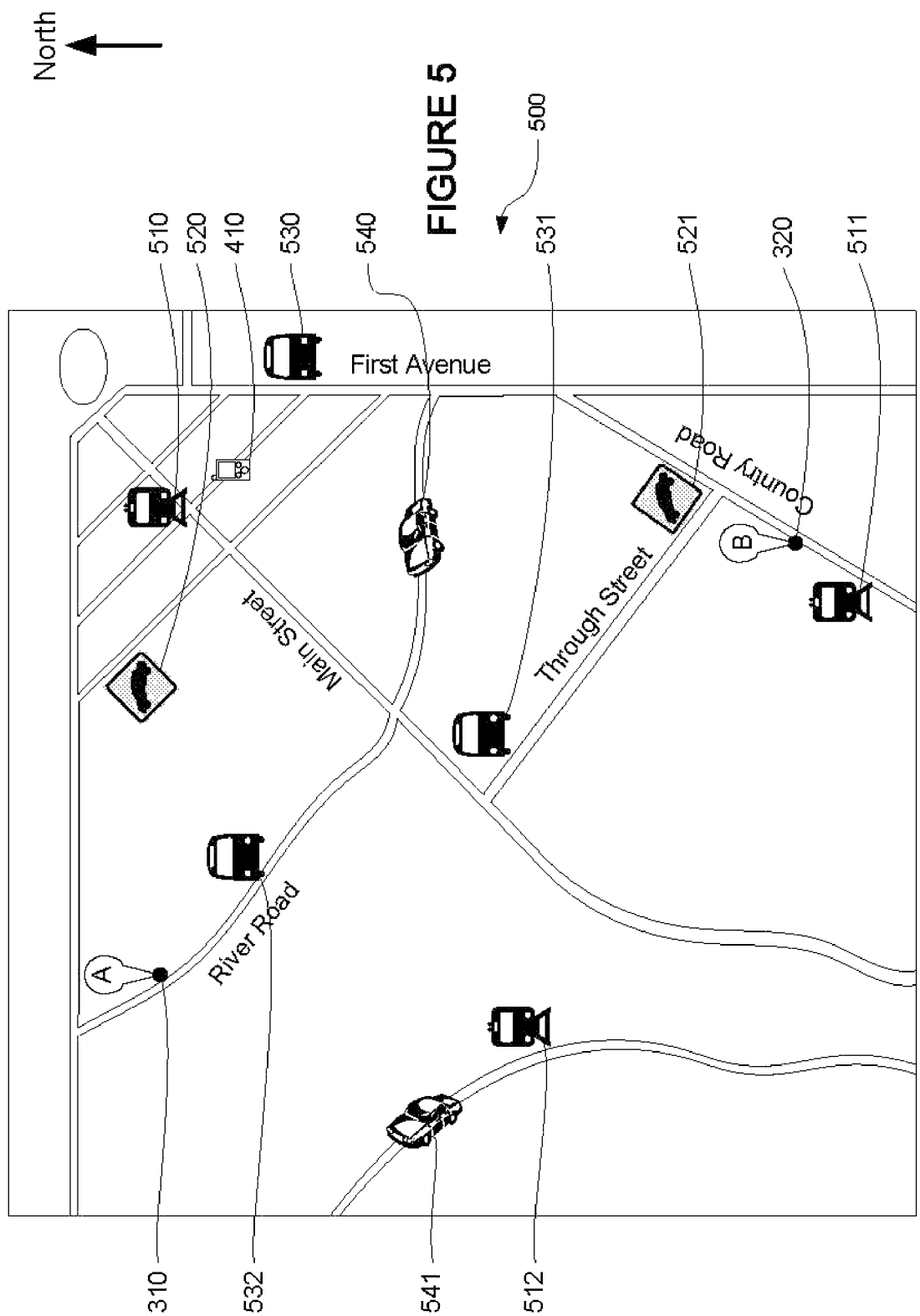
FIG. 5 is a further map of exemplary data in accordance with an aspect of the invention.

When a customer is identified by the server as matching a target customer profile, the server may determine whether and what transportation options are available to the customer at the present (or possibly some future) time. For example, as shown in map 500 of FIG. 5, the server may have access to transportation information which includes the locations and availability of various transportation options proximate to the customer (and the business location). For example, the server may identify public transportation options such as train stations 510-12 or bus stops 530-32 and the respective schedules of these options. The server may also identify other transportation businesses such as taxi services 520-21 or the taxis 540-41, and the availability of these vehicles. In another example, taxi services 520-21 and taxis 540-41 may be associated with semi or fully autonomous vehicles which may be dispatched to a customer in order to transport the customer to the business location. In another example, the server may operate as a central dispatching service for the taxi or autonomous vehicle service.

Using the geographic location of the customer's client device, the server may automatically calculate the potential costs of transporting the customer to the business location of the matched target customer profile, taking into consideration transit options available and travel time. For example, the server may calculate a route and estimated travel time from the customer's current location to the business location based on the type of available transportation. The server may then determine the potential fare for a cab from location 410 to business location 310 based upon the route and estimated travel time. The server may also calculate the potential cost of the customer using public transportation or recommend walking routes. The server may also consider weather conditions, and for example, the server may be less likely to recommend walking in the rain.

In some examples, this calculation may also consider any preferences included in the customer's user data or the advertiser's bid and budget structure. For example, the customer may select to only take taxis or autonomous vehicles and never to take public transportation. In another example, the advertiser may select to only offer rail transportation because the business is located close to a subway or train station.

The server then conducts an auction based on the various bid types described above and selects a winning advertiser or advertisers. For example, if there is only one advertiser, the server may determine whether the advertiser's bid would be greater than the estimated cost to transport the customer to the advertiser's business location. In another example, if there are multiple target customer profiles, the server may conduct a real-time auction to select one or more winning advertisers. For example, if a customer satisfies the target customer profiles of both Business A and Business B, but is located closer to business location 310 than business location 320, the cost to transport the customer may be greater for Business B than for Business A. The server may then select Business A or Business B depending upon the bid values for each advertiser. This determination may be based on a plurality of different advertising algorithms or machine learning routines used to select and display Internet advertisements such as those displayed on a web search results page. In some examples, the server may consider the order in which the advertisements are displayed. For example, an advertiser may be required to pay more for a higher display ranking (or being displayed towards the top of a display) when the advertiser's advertisement is displayed.

Figure 6:
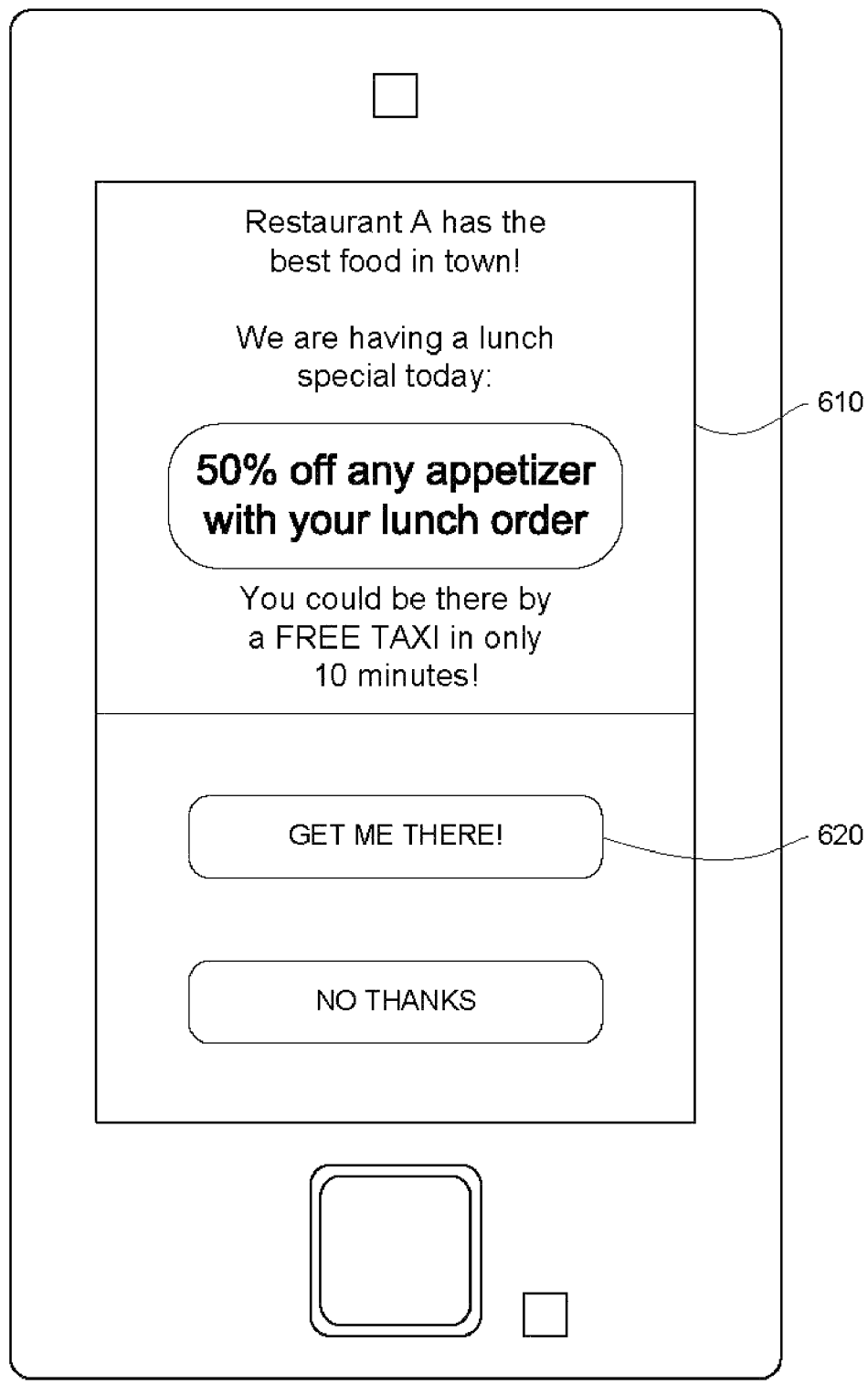
FIG. 6 is an exemplary client device and screen shot in accordance with an aspect of the invention.

The server may offer the customer transportation to the winning advertiser or advertisers' business location based on certain terms. The customer may receive an advertisement on the user's mobile computer or phone offering free transportation to and from the business location or transportation rebates upon making a purchase. If there is more than one winning advertiser, the client device may display a second advertisement as well. The customer may select a link or button indicating that the customer would like the transportation. For example, as shown in FIG. 6, an advertisement 610 may include information such as a coupon or other incentive, an estimated transport time, and a type of transportation. If the customer is interested in traveling to the business location, the customer may select an option 620 to inform the server of the decision. In response, the server may provide the transportation information (directions, etc.) and/or make any necessary arrangements (for example, dispatching a taxi or autonomous vehicle). In some examples, the customer and the dispatch service may schedule time that the customer will be ready to be picked up or a dispatched vehicle will be available to collect the customer.

Figure 7:
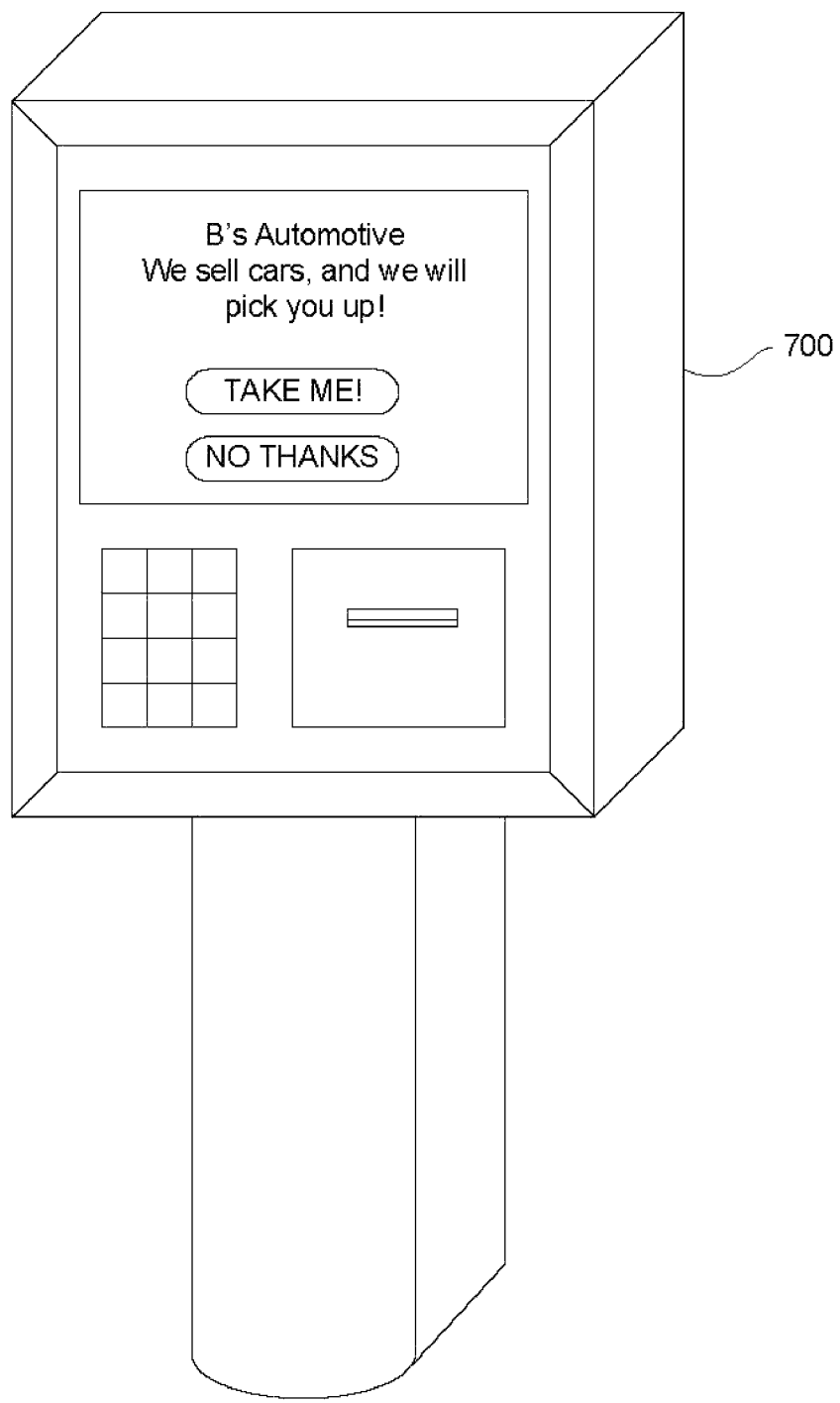
FIG. 7 is another exemplary client device and screen shot in accordance with an aspect of the invention.

In another example, the dispatching service may be offered at a kiosk such as kiosk 700 of FIG. 7. The kiosk may operate similarly to a mobile phone or personal computer though may use a different user interface or require different information. For example, the customer may enter identifying information at the kiosk and select whether to have an advertiser send an autonomous vehicle to pick up the customer. In response, the dispatching service may provide the customer with the location and direction for using nearby transportation, such as public transportation, or dispatch an autonomous vehicle or taxi to the customer.

The server may also provide additional information regarding transportation options to the client device for display to the customer. For example, the server may determine that public transportation may take 20 minutes to arrive whereas an autonomous vehicle may take 10 minutes to arrive at the business location. This information may be displayed to the customer, for example, at the kiosk or customer's computer in order to allow the customer to decide which transportation to take.

Flow diagram 800 of FIG. 8 depicts aspects of the process described above. At block 802 the server receives geographic location information associated with a client device. For example, the client device may transmit geolocation coordinates to the server. At block 804, the server accesses user data for a plurality of users. This user data may be submitted by users in order to receive advertisements. At block 806, the server identifies the user (and the user's user data) based on any one of the methods described above. The server also accesses a plurality of target customer profiles associated with at least one requirement at block 808. Each target customer profile is associated with an advertisement. Each advertisement is associated with a business location and a bid value. At block 810, the server identifies an advertisement based on whether the user data associated with the identified user satisfies the at least one requirement (associated with the identified advertisement). At block 812, the server identifies one or more transportation options (such as public transportation, autonomous vehicles, taxis, etc.) for transporting the user to the business location associated with the identified advertisement. For each transportation option, the server determines a cost to transport the user to the business location associated with the identified advertisement at block 814. The server then selects a transportation option based on the bid value associated with the identified advertisement and the cost value associated with the one or more transportation options at block 816. The server then transmits the advertisement and the selected transportation option to the client device for display at block 818.

At block 820, the server receives a request for the selected transportation option. At block 822, the server arranges the selected transportation option, for example, by dispatching a vehicle or providing instructions for using public transportation.

If the server dispatches an autonomous vehicle, taxi, or other transportation to the customer, the customer may be required to identify him or herself to the vehicle or vehicle's driver before using the transportation. For example, the user may be required to show a driver's license, enter a user name and password upon entering the vehicle, or use an RFID badge or other item to automatically provide his or her user information. Once the customer has been identified, the customer may use the dispatched transportation to reach the business location.

The server may charge the advertiser after the occurrence of various events. The advertiser may be charged when the advertisement has been displayed, the customer has requested a vehicle to be dispatched, the customer has arrived at the business location, and/or the customer has taken some action such as completing business transaction at the business location.

Advertisers may also bid on having an autonomous vehicle return to the business location to take the customer home or back to the original pick up location.

In some examples, the user may be accompanied by one or more additional passengers. The user may provide this information in a profile, but may also provide it in response to being prompted by the client device. This information may be used by the server, for example, to identify a target profile as well as determine the types and cost of transporting the user and the passengers to a business location. For instance, a user with two additional passengers would not be able to use a vehicle equipped for only two people. Similarly, it may be more expensive to transport a group of 5 people as it may require a van or two taxies. Thus, the server may take this into consideration when calculating the cost of transporting the passengers as well as selecting advertisers willing to pay for more expensive transportation.

In another example, the user may indicate that he or she is accompanied by one or more children. In response the server may identify business locations appropriate for families. In a further example, the user may identify the server that he or she is accompanied by another adult. Again in response, the server may identify business locations appropriate for adults, for example, "romantic" restaurants.

In another scenario, a business may specify a number of passengers in a profile or advertisement. For example, the business may specify a minimum number of passengers, a maximum number of passengers, or a range. A theme park may prefer to display advertisements to users indicating that they are accompanied by one or more children in order to increase revenue. A movie theater may offer a discount coupon for users in a carpool. In this case, the movie theater may also bundle the transportation arrangements with ticket purchases so that users are unlikely to lie about the number of passengers. In another example, a night club may prefer groups in order to have them stay longer or spend more money. In yet another example, a retail store may offer a personal discount code to each passenger of a group of passengers when the transportation is arranged. The retail store may track how many of the discount codes are used to determine how many of the passengers actually used the service and purchased goods and/or services.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method of dispatching autonomous vehicles to transport a user, the method comprising:
receiving, by one or more processors of a server computer, a request for transportation identifying a location of a client device of a user;
identifying, by the one or more processors, a profile of the user of the client device, the profile identifying characteristics associated with the user;
determining, by the one or more processors, a route from the location of the client device to a location of a business;
determining, by the one or more processors, whether an autonomous vehicle is available to transport the user along the route;
when the autonomous vehicle is available, determining, by the one or more processors, a first cost value for the route based at least in part on the profile;
determining, by the one or more processors, whether a second cost value associated with the location of the business satisfies the first cost value, wherein the second cost value is associated with a bid for an advertisement;
when the second cost value satisfies the first cost value, transmitting, by the one or more processors, a message over a network to the client device, the message including the advertisement and a selected transportation option; and
upon receiving a request from the client device over the network for the selected transportation option, dispatching, by the one or more processors, the autonomous vehicle to the location of the client device in order to transport the user to the location of the business according to the route.

2. The method of claim 1, wherein the characteristics associated with the user include a preference for autonomous vehicles over other types of transportation.

3. The method of claim 1, further comprising determining the second cost value associated with the location of the business based on a home location identified in the profile.

4. The method of claim 1, further comprising determining the second cost value associated with the location of the business based on a distance between the location of the business and the location of the client device.

5. The method of claim 1, further comprising determining the second cost value associated with the location of the business by selecting autonomous vehicles as a type of transportation for the second cost value.

6. The method of claim 1, further comprising determining the second cost value associated with the location of the business based on an estimated time to transport the user to the location of the business from the location of the client device.

7. The method of claim 6, wherein determining the second cost value associated with the location of the business is further based on a current time of day when the user will be transported.

8. A system for dispatching autonomous vehicles to transport a user, the system comprising:
a server computer having one or more processors configured to:
receive a request for transportation identifying a location of a client device of a user;
identify a profile of the user of the client device, the profile identifying characteristics associated with the user;
identifying an advertisement based on the profile of the user and the location of the client device, wherein the advertisement is associated with a business location and a bid value;
determine a route from the location of the client device to the location of the business;
determine a transportation option of dispatching an autonomous vehicle to transport the user along the route and a cost value for transporting the user along the route;
determine whether the bid value satisfies the cost value;
when the bid value satisfies the cost value, transmit, by the one or more processors, a message over a network over the network to the client device, the message including the advertisement and an indication of the determined transportation option; and
upon receiving a request from the client over the network for the determined transportation option, dispatch, by the one or more processors, the autonomous vehicle to the location of the client device in order to transport the user to the location of the business according to the route.

9. The system of claim 8, wherein the characteristics associated with the user include a preference for autonomous vehicles over other types of transportation.

10. The system of claim 8, wherein the one or more processors are further configured to determine the bid value associated with the advertisement based on a home location identified in the profile.

11. The system of claim 8, wherein the one or more processors are further configured to determine the bid value associated with the advertisement based on a distance between the location of the business and the location of the client device.

12. The system of claim 8, wherein the one or more processors are further configured to determine the bid value associated with the advertisement by selecting autonomous vehicles as a type of transportation for the bid value.

13. The system of claim 8, wherein the one or more processors are further configured to determine the bid value associated with the advertisement further on an estimated time to transport the user to the location of the business from the location of the client device.

14. The system of claim 13, wherein the one or more processors are further configured to determine the bid value associated with the advertisement further based on a current time of day when the user will be transported.

15. The system of claim 8, further comprising the autonomous vehicle.

16. A method of dispatching autonomous vehicles to transport a user, the method comprising:
- receiving, by one or more processors of a server computer, a request for transportation identifying a location of a client device of a user;
- identifying, by the one or more processors, a profile of the user of the client device, the profile identifying characteristics associated with the user;
- identifying, by the one or more processors, an advertisement based on the profile of the user and the location of the client device, wherein the advertisement is associated with a business location and a bid value;
- determining, by the one or more processors, a route from the location of the client device to the location of the business;
- determining by the one or more processors, a transportation option of dispatching an autonomous vehicle to transport the user along the route and a cost value for transporting the user along the route;
- determining by the one or more processors, whether the bid value satisfies the cost value;
- when the bid value satisfies the cost value, transmitting, by the one or more processors, a message over a network to the client device, the message including the advertisement and an indication of the determined transportation option; and
- upon receiving a request from the client device over the network for the determined transportation option, dispatching, by the one or more processors, the autonomous vehicle to the location of the client device in order to transport the user to the location of the business according to the route.

17. The method of claim 16, wherein the method further comprises determining the bid value associated with the advertisement based on a home location identified in the profile.

18. The method of claim 16, wherein the method further comprises determining the bid value associated with the advertisement based on a distance between the location of the business and the location of the client device.

19. The method of claim 16, wherein the method further comprises determining the bid value associated with the advertisement by selecting autonomous vehicles as a type of transportation for the bid value.

20. The method of claim 16, wherein the method further comprises determining the bid value associated with the advertisement based on an estimated time to transport the user to the location of the business from the location of the client device.

* * * * *